United States Patent
Peev et al.

(10) Patent No.: US 10,186,058 B2
(45) Date of Patent: Jan. 22, 2019

(54) VISUALIZATION OF CROSS-PIVOTED DATA

(71) Applicant: Microsoft Technology Licensing, LLC, Redmond, WA (US)

(72) Inventors: Igor Peev, Arlington, WA (US); Ehab Sobhy, Redmond, WA (US); Lewey Geselowitz, Redmond, WA (US); Paavany Jayanty, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 14/938,135

(22) Filed: Nov. 11, 2015

(65) Prior Publication Data
US 2017/0132815 A1    May 11, 2017

(51) Int. Cl.
*G06T 11/20*  (2006.01)
*G06F 17/30* (2006.01)
*G06F 17/24* (2006.01)
*G06T 19/00* (2011.01)

(52) U.S. Cl.
CPC .......... *G06T 11/206* (2013.01); *G06F 17/245* (2013.01); *G06F 17/30994* (2013.01); *G06T 19/00* (2013.01)

(58) Field of Classification Search
CPC .................................................. G06T 11/206
See application file for complete search history.

(56) References Cited

U.S. PATENT DOCUMENTS

| | | | |
|---|---|---|---|
| 6,707,454 B1 | 3/2004 | Barg et al. | |
| 7,529,727 B2 | 5/2009 | Arning et al. | |
| 7,818,286 B2* | 10/2010 | Chu ...................... | G06Q 30/02 707/600 |
| 8,140,586 B2 | 3/2012 | Stolte et al. | |
| 8,793,619 B2 | 7/2014 | Roe et al. | |

(Continued)

FOREIGN PATENT DOCUMENTS

WO    2014107119 A1    7/2014

OTHER PUBLICATIONS

Mansmann, et al., "Hierarchy-driven Visual Exploration of Multi-dimensional Data Cubes", In Proceedings of Business, Technologies and Web, vol. 103, Mar. 2007, 16 pages.

(Continued)

*Primary Examiner* — Daniel F Hajnik (57) ABSTRACT

Various techniques for visualizing cross-pivoted tables are disclosed herein. In one embodiment, a method includes determining if a first dimension and a second dimension of a cross-pivoted table contain non-numerical values, the cross-pivoted table having a plurality of data points each dependent upon a first value in the first dimension and a second value in the second dimension. In response to determining that the first dimension and the second dimension contain non-numerical first and second values, the non-numerical first and second values can be converted to corresponding numerical first and second values. The method can then include plotting, on a display, a visual representation of the plurality of data points of the cross-pivoted table using the numerical first and second numerical values as first and second axis, respectively.

17 Claims, 6 Drawing Sheets

(56) References Cited

U.S. PATENT DOCUMENTS

| | | | | |
|---|---|---|---|---|
| 2002/0131651 | A1* | 9/2002 | Anantharamu | G06T 3/40 |
| | | | | 382/284 |
| 2005/0168778 | A1* | 8/2005 | Abe | G06F 17/211 |
| | | | | 358/1.18 |
| 2006/0031187 | A1* | 2/2006 | Pyrce | G06F 3/04815 |
| 2007/0171224 | A1* | 7/2007 | MacPherson | G06F 3/0481 |
| | | | | 345/440 |
| 2008/0103863 | A1* | 5/2008 | Holm-Petersen | G06Q 10/06 |
| | | | | 705/7.27 |
| 2010/0324924 | A1* | 12/2010 | Frederiksen | G06Q 30/04 |
| | | | | 705/2 |
| 2011/0050702 | A1* | 3/2011 | Heimendinger | G06T 11/206 |
| | | | | 345/440 |
| 2013/0097563 | A1 | 4/2013 | Pacheco Rodrigues Velho et al. | |
| 2015/0170384 | A1* | 6/2015 | Matsumoto | G06T 11/60 |
| | | | | 345/629 |

OTHER PUBLICATIONS

Gorban, et al., "ViDaExpert: user-friendly tool for nonlinear visualization and analysis of multidimensional vectorial data", In Proceedings of Computing Research Repository, Jun. 2014, 9 pages.

Poco, et al., "A Framework for Exploring Multidimensional Data with 3D Projections", In Proceedings of IEEE Symposium on Visualization, vol. 30, Issue 3, Jun. 28, 2011, 10 pages.

Elmqvist, et al., "Hierarchical Aggregation for Information Visualization: Overview, Techniques and Design Guidelines", In Proceedings of IEEE Transactions on Visualization and Computer Graphics, vol. 16, Issue 3, Jul. 31, 2009, 14 pages.

Shrinivasan, et al., "Supporting Exploratory Analysis with the Select & Slice Table", In Proceedings of IEEE-VGTC Symposium on Visualization, vol. 29, Issue 3, Jun. 2010, 10 pages.

Yu, et al.,"MLMD: Multi-Layered Visualization for Multi-Dimensional Data", In Proceeding of the Eurographics Conference on Visualization, Jun. 17, 2013, 5 pages.

Eick, Stephen G., "Visualizing Multi-dimesnional Data", Published on: Feb. 2000 Available at: http://herakles.zcu.cz/seminars/docs/infovis/papers/Eick_advizor_99.pdf.

"Excel and Power BI for Office 365", Published on: Feb. 2000 Available at: http://goo.gl/4j54i1.

Gray, et al., "Data Cube: A Relational Aggregation Operator Generalizing Group-By, Cross-Tab, and Sub-Totals", In Proceedings of the Twelfth International Conference on Data Engineering, Feb. 26, 1996, pp. 152-159.

Elmqvist, et al., "DataMeadow: a visual canvas for analysis of large-scale multivariate data", In Journal of Information Visualization—Special issue on visual analytics science and technology, vol. 7, Issue 1, Mar. 2008, 16 pages.

Stolte, et al., "Polaris: A system for query, analysis, and visualization of multidimensional relational databases", In Proceedings of the IEEE Symposium on Information Vizualization, vol. 8, Issue 1, Jan. 2002, pp. 1-14.

* cited by examiner

VISUALIZATION OF CROSS-PIVOTED DATA

BACKGROUND

Data visualization presents data in graphics, plots, maps, or charts to clearly and efficiently communicate information to users. Effective data visualization can help users in analyzing and reasoning based on underlying data. Data visualization can also render complex data more accessible, understandable, and usable than simply a collection of numbers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An increasingly information-based economy has driven up data generation. Data created by internet activity and expanding numbers of sensors, such as satellites and traffic cameras, are often referred to as "Big Data." Communicating such data presents a variety of analytical challenges for data visualization. For example, a large portion of data available on the Internet is cross-pivoted because humans can more easily comprehend numbers in a table format than just a collection of data points. However, unlike humans, computers prefer a set of data points that are normalized or "flattened" from the cross-pivoted data in order to plot visual representations of the cross-pivoted data. Tools for flatten cross-pivoted data typically require intimate knowledge of the underlying data and can be costly and unreliable.

Several embodiments of the disclosed technology allows visualization of cross-pivoted data without un-pivoting or flattening cross-pivoted data. In certain embodiments, text, date, time, or other suitable types of non-numerical data in columns and/or rows of a cross-pivoted data set can be converted into numerical values based on corresponding string, date, time values or other suitable data properties. For example, text strings can be converted based on ASCII values corresponding to the text strings. In other embodiments, the non-numerical data in columns and/or rows can also be converted to numerical values by assigning a distinctive numerical value to each of the non-numerical value. The converted cross-pivoted data can then be rendered as a three-dimensional graph showing the cross-pivoted data as bar graphs, pie charts, and/or other suitable representations. As such, data points in the cross-pivoted data set can be visualized without being un-pivoted or flattened.

DETAILED DESCRIPTION

Certain embodiments of systems, devices, components, modules, routines, and processes for visualizing cross-pivoted data are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-6.

As used herein, the term "cross-pivoted" table or data generally refers to a data set having at least two dimensions (e.g., a column and a row) and a plurality of data points individually corresponding to and dependent upon a combination of values along the at least two dimensions. In contrast, a "flattened" or "flat" table generally refers to a set of data points whose values are not dependent upon or determined by one or more of the dimensions in the data set. Instead, the data points are arranged as a single row or column of data points.

A flat table can be summarized to provide information as a cross-pivoted table. For example, the following is an example flat table illustrating sales records for a clothing store:

| Region | Gender | Ship date    | Units | Price |
|--------|--------|--------------|-------|-------|
| East   | Boy    | Jan. 31, 2015 | 12    | 11.04 |
| East   | Girl   | Jan. 31, 2015 | 10    | 11.96 |
| West   | Boy    | Feb. 28, 2015 | 9     | 10.87 |
| North  | Girl   | Feb. 28, 2015 | 11    | 11.54 |

As shown above, the example flat table includes a collection of data points each as a single row of data. The column and row in the flat table identify categories, but do not contain data. Summarizing or cross-pivoting the flat table can allow humans to more easily comprehend the underlying data. For instance, the foregoing flat table can be pivoted, for example, to generate a cross-pivoted table showing region and ship dates as following:

| Region | Jan. 31, 2015 | Feb. 28, 2015 |
|--------|---------------|---------------|
| East   | 22            | 0             |
| West   | 0             | 9             |
| North  | 0             | 11            |

As shown above, each data point (i.e., 22, 0, 9, and 11) has a value that is dependent upon or determined by a combination of a region value along the row and a ship date value along the column.

Humans can more easily comprehend numbers in a table format than just a collection of data points. For instance, in the examples above, the cross-pivoted table can be easily understood as showing a summary of units for each region and ship date. However, unlike humans, computers prefer the flat table above in order to plot visual representations of the cross-pivoted data. Thus, a cross-pivoted table needs to be flattened in order for a computer to generate plots or graphical representations. Tools for flatten cross-pivoted data typically require intimate knowledge of the underlying data and can be costly and unreliable. For example, recreating the flat table above from the cross-pivoted table can be difficult and inaccurate.

Several embodiments of the disclosed technology allows visualization of cross-pivoted tables without being flattened by converting non-numerical data in columns and/or rows of a cross-pivoted table into numerical values based on corresponding string, date, time values or other suitable data properties. For example, text strings (e.g., "East," "West," "North") can be converted based on ASCII values corresponding to the text strings. In other embodiments, the non-numerical data in columns and/or rows can also be converted to numerical values by assigning a distinctive numerical value (e.g., 1, 2, and 3) to correspond to each of the non-numerical value (e.g., "East," "West," "North"). The converted cross-pivoted table can then be rendered as a three-dimensional graph showing the cross-pivoted table as three-dimensional bar graphs, pie charts, and/or other suitable representations. As such, cross-pivoted tables can be visualized without being un-pivoted or flattened.

Figure 1:
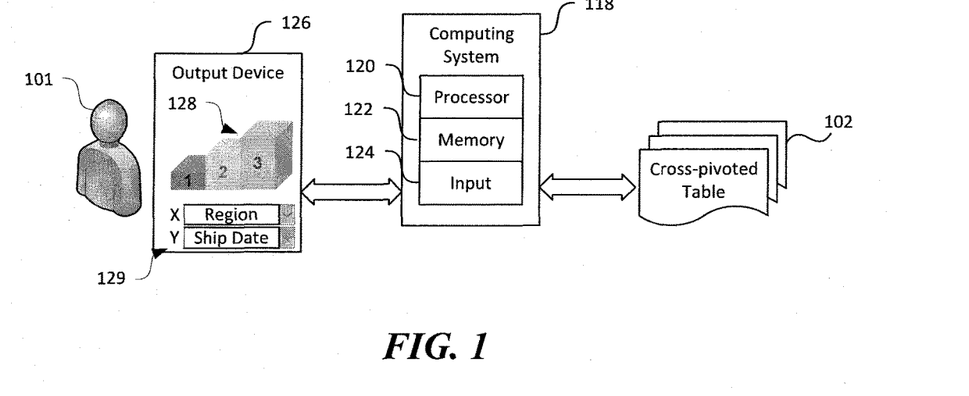
FIG. 1 is a schematic diagram illustrating a computing system configured to provide visualization of cross-pivoted data in accordance with embodiments of the disclosed technology.

FIG. 1 is a schematic diagram illustrating a computing system 118 configured to provide visualization of cross-pivoted data in accordance with embodiments of the disclosed technology. As shown in FIG. 1, the computing system 118 can include a processor 120 coupled to a memory 122, an input component 124, and an output device 126. The processor 120 can include a microprocessor, a field-programmable gate array, and/or other suitable logic devices. The memory 122 can include volatile and/or non-volatile computer readable media (e.g., ROM; RAM, magnetic disk storage media; optical storage media; flash memory devices, EEPROM, and/or other suitable non-transitory storage media) configured to store data received from, as well as instructions for, the processor 120. In one embodiment, both the data and instructions are stored in one computer readable medium. In other embodiments, the data may be stored in one medium (e.g., RAM), and the instructions may be stored in a different medium (e.g., EEPROM). The input component 124 can include a keyboard, a track ball, a gauge or dial, and/or other suitable types of input device configured to receive input from a user 101 or a cross-pivoted table 102. The output device 126 can include a display, a touch screen, or other suitable output component configured to display, for example, a visual representation 128 of the cross-pivoted table 102 without flattening or un-pivoting the cross-pivoted table 102.

In operation, the computing system 118 can receive the cross-pivoted table 102 from a variety of sources via the input component 124. For example, in one embodiment, the computing system 118 can receive the cross-pivoted table 102 as a spreadsheet from a website. In another embodiment, the user 101 can create the cross-pivoted table 102 on the computing system 118 using, for instance, the input component 124. In other embodiments, the computing system 118 can receive the cross-pivoted table 102 as a database file, a comma separated value file, or other suitable types of files.

The computing system 118 can also determine if the received cross-pivoted table 102 includes one or more data dimensions (e.g., along a column or row) that contain non-numerical values. For example, the processor 120 in cooperation with the memory 122 can determine if a column and/or row of the cross-pivoted table 102 contains text strings, dates, times, or other types of non-numerical values. In response to determining that the column and/or row of the cross-pivoted table 102 contains non-numerical values, the processor 120 can convert the non-numerical values into numerical values.

In certain embodiments, the processor 120 can convert the non-numerical values into numerical values by building numerical indices based on data properties of the non-numerical values. For example, the processor 120 can convert text strings to an integer based on, for instance, an ASCII values of the text strings. In other examples, the processor 120 can also convert date and/or time values into corresponding numerical values based on a reference point (e.g., Jan. 1, 1900). In further embodiments, the processor 120 can assign distinct numerical values to the corresponding non-numerical values. For instance, in the example cross-pivoted table above, three region values are presented, i.e., "East," "West," and "North." In certain examples, the processor 120 can assign sequential integers (e.g., 10, 20, and 30) to each one of the three region values. In other examples, the processor 120 can assign random numbers (e.g., between 0-100) to each one of the three region values. In further examples, the processor 120 can assign other suitable numerical values in any suitable manners.

Subsequent to converting the non-numerical values, the process 120 can then generate the visual representation 128 of the cross-pivoted table 102 based on the converted numerical values along one or more of the data dimensions. For example, as shown in FIG. 1, the visual representation 128 can include a three-dimensional bar graph. In other examples, the visual representation 128 can also include pie charts, area charts, or other suitable visual representations. The output device 126 can then render and display the generated visual representation 128 to the user 101. Additional example visual representations 128 are discussed in more detail below with reference to FIGS. 5A and 5B.

In certain embodiments, the processor 120 can also cause the output device 126 to display a set of control selectors 129 that allow the user 101 to further explore the displayed visual representation 128. For example, as illustrated in FIG. 1, the control selectors 129 can include one or more drop-down boxes for selecting, for instance, one or more axes for displaying the visual representation 128. In the illustrated embodiment, "Region" is selected as the x-axis, and "Ship Date" is selected to be the y-axis. In other embodiments, any one of the "Region," "Gender," "Ship date," "Units," or "Price" may be selected to be one of the x- or y-axis.

Several embodiments of the computing system 118 can also allow displaying of multiple visual representations 128 (not shown) on the output device 126 at the same time. For example, the output device 126 can display two three-dimensional graphs in a tiered arrangement. The first three-dimensional graph can be displayed with "Region" as x-axis and "Ship Date" as y-axis. The second three-dimensional graph can be displayed with "Region" as x-axis but "Gender" as y-axis. In other examples, additional visual representations may be displayed based on the same cross-pivoted table 102 or different cross-pivoted tables (not shown).

In certain embodiments, the processor 120 can cause the output device 126 to animate the visual representation 128 based on date, time, or other suitable values. For example, in one embodiment, the visual representation 128 can be animated to show units sold based on a time lapse of the ship dates by displaying, for instance, bars representing the units sold for a particular ship date in a sequence. In other examples, the visual representation 128 can be animated to show units sold based on "Region," "Gender," or other suitable data dimensions.

In other embodiments, the processor 120 can receive user input to drill down or otherwise further explore the displayed visual representation 128. For instance, in the example above, the user 101 may select to drill down on a bar graph representing units sold for "East" with a ship date of "Jan. 31, 2015" to see a breakdown of the units sold based on "Gender." In other examples, the user 101 may drill down based on "Price" or other suitable categories.

The displayed visual representation 128 can also allow the user 101 to explore very large amount of data because the three-dimensional visual representation 128 does not have any "fence post." As such, the user 101 may navigate from one portion of the visual representation 128 to another without being limited to a certain area. In certain embodiments, the processor 120 can also cause the output device 128 to display a marker, sign, or other suitable indicator to inform the user 101 a relative position of the displayed portion relative to a reference point in the visual representation 128.

In further embodiments, the processor 120 can also accept input from the user 101 regarding a hierarchy of categories to be displayed in the visual representation 128. For example, the user 101 may specify that "West" region includes, for instance, Washington, Oregon, California, and Arizona. As such, the output device 128 can display and allow the user 101 to drill down into each state for units sold if corresponding data is available.

Several embodiments of the disclosed technology allow the user 101 to visualize the cross-pivoted table 102 without time consuming and potentially inaccurate flattening or un-pivoting of the cross-pivoted table 102. As a result, visual representations of large amount of data can be efficiently and accurately generated. In addition, by displaying the visual representation 128 as three-dimensional graphs, the user 101 can be allowed to explore very large or even potentially endless amount of data.

Figure 2:
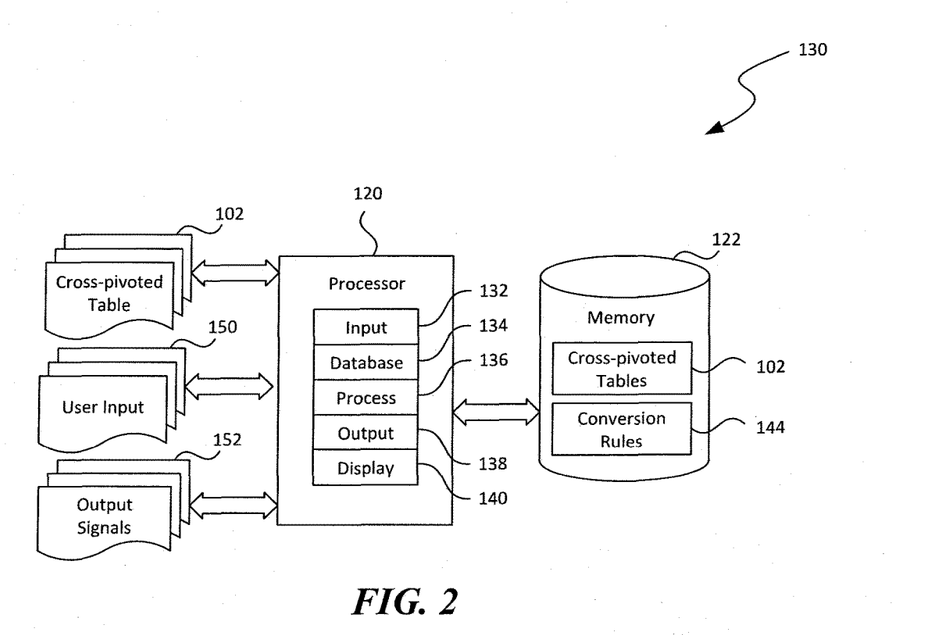
FIG. 2 is a block diagram showing software components suitable for the processor of the computing system in FIG. 1 in accordance with embodiments of the disclosed technology.

FIG. 2 is a block diagram showing software components 130 suitable for the processor 120 of the computing system 118 in FIG. 1 in accordance with embodiments of the disclosed technology. In FIG. 2 and in other Figures hereinafter, individual software components, objects, classes, modules, and routines may be a computer program, procedure, or process written as source code in C, C++, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). Components within a system may take different forms within the system. As one example, a system comprising a first component, a second component and a third component can, without limitation, encompass a system that has the first component being a property in source code, the second component being a binary compiled library, and the third component being a thread created at runtime.

The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware can be considered fossilized software, and software can be considered liquefied hardware. As just one example, software instructions in a component can be burned to a Programmable Logic Array circuit, or can be designed as a hardware circuit with appropriate integrated circuits. Equally, hardware can be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the software modules 130 of the computing system 118 can include an input module 132, a database module 134, a process module 136, an output module 138, and, optionally, a display module 140 interconnected with one another. In operation, the input module 132 may receive the cross-pivoted table 102 and accept an user input 150, such as control selections (e.g., axis selection), and communicates the accepted information or selections to other components for further processing. The database module 134 organizes records, including cross-pivoted tables 102 and optional conversion rules 144, and facilitates storing and retrieving of these records to and from the memory 122. Any type of database organization may be utilized, including a flat file system, hierarchical database, relational database, or distributed database, such as provided by a database vendor such as the Oracle Corporation, Redwood Shores, Calif.

The process module 136 analyzes the cross-pivoted table 102, and the output module 138 generates output signals 152 based on the analyzed cross-pivoted table 102. The processor 120 can also include the display module 140 for displaying, printing, or downloading the cross-pivoted table 102, the output signals 152, and/or other information via the output device 126 (FIG. 1) and/or other suitable devices. Embodiments of the process module 136 are described in more detail below with reference to FIG. 3.

Figure 3:
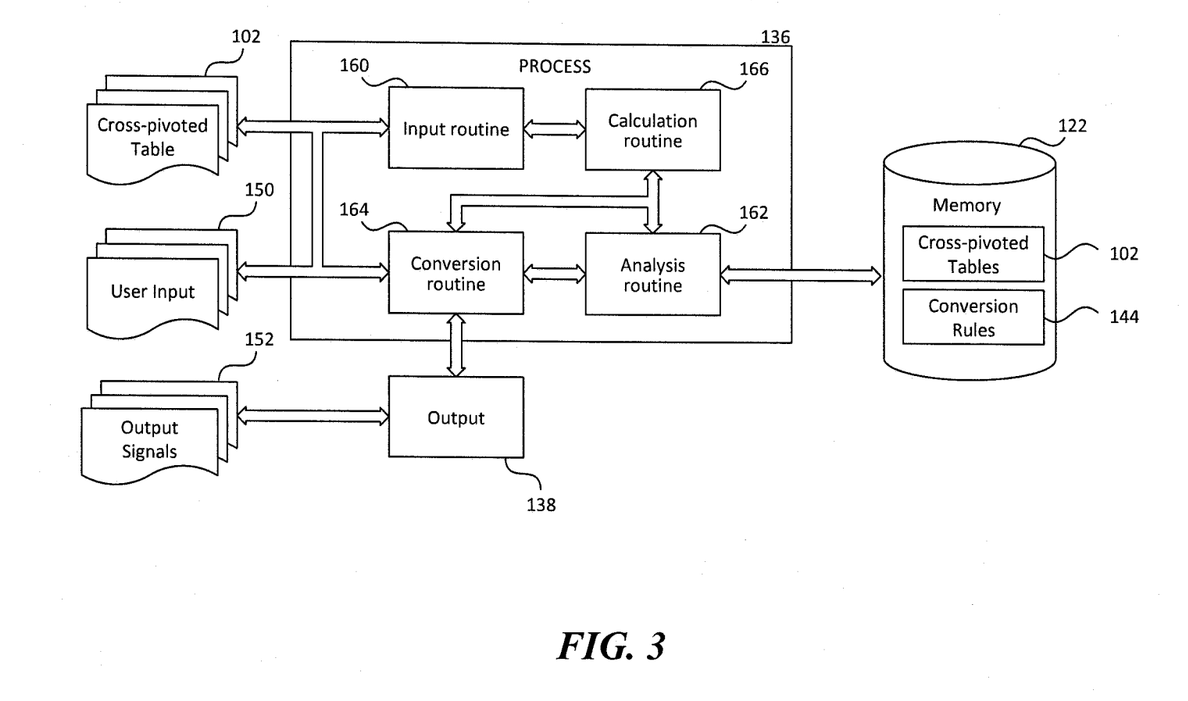
FIG. 3 is a block diagram showing software modules suitable for the process component of FIG. 2 in accordance with embodiments of the disclosed technology.

FIG. 3 is a block diagram showing embodiments of the process module 136 of FIG. 2. As shown in FIG. 3, the process module 136 may further include an input routine 160, an analysis routine 162, a conversion routine 164, and a calculation routine 166 interconnected with one other. Each routine may be a computer program, procedure, or routine written as source code in a conventional programming language, or one or more modules may be hardware modules.

The input routine 330 is configured to receive the cross-pivoted table 102 and the user input 150. For example, the input routine 160 can be configured to receive the cross-pivoted table 102 as a spreadsheet file, a common separated value file, or other suitable type so file. The input routine 160 may have procedures including, for example, linear interpolation, logarithmic interpolation, data mapping, or other suitable procedures.

The calculation routine 166 can include procedures configured to perform various types of calculation to facilitate operation of other modules. For example, the calculation routine 166 can include summers, subtractors, counters, timers, and/or other suitable procedures for calculating a numerical value based on a property of a non-numerical value. For instance, in one embodiment, the calculation routine 168 can include a procedure that converts a text string (e.g., "East") to a numerical value (e.g., 10197115116). In another example, the calculation routine 168 can include another procedure that converts a date value (e.g., Jan. 31, 2015) to another numerical value (e.g., 42035). In further examples, the calculation routine 166 can also include procedures that assign a sequential, random, or other suitable types of numerical values to a set of non-numerical values.

The analysis routine 162 can be configured to analyze the received cross-pivoted table 102 from the input routine 162 and to determine whether one or more data dimensions of the cross-pivoted table 102 contain non-numerical values. In one embodiment, the analysis routine 162 can inspect a data property of the values in one or more of the data dimensions in the received cross-pivoted table 102. For example, the analysis routine 162 can identify that the data dimension "Region" contains a plurality of text strings (i.e., "East," "West," and "North"). In other embodiments, the analysis routine 162 can inspect metadata or other suitable information associated with the received cross-pivoted table 102 to detect non-numerical values.

The conversion routine 164 can be configured to convert non-numerical values along one or more data dimension of the received cross-pivoted table 102 into numerical values by, for instance, utilizing the calculation routine 166. For example, in certain embodiments, in response to a determination by the analysis routine 162 that one or more data dimensions of the cross-pivoted table 102 contain non-numerical values, the conversion routine 164 can instruct the calculation routine 166 to convert the non-numerical values based on, for instance, conversion rules 144 from the memory 122. The conversion rules 144 can be configured by the user 101 to indicate how certain types of non-numerical values should be converted. For instance, the conversion rules 144 can specify that all text strings can be converted based on their corresponding ASCII values. Alternatively, the conversion rules 144 can specify that text strings can be assigned sequential or random numerical values alphabetically or in other suitable sequences. The conversion routine 164 can then provide the cross-pivoted table 102 with the converted numerical values to the output module 138 to generate the visual representation 128 (FIG. 1) as output signals 152 to be displayed on the output device 126 (FIG. 1) to the user 101 (FIG. 1).

Figure 4A:
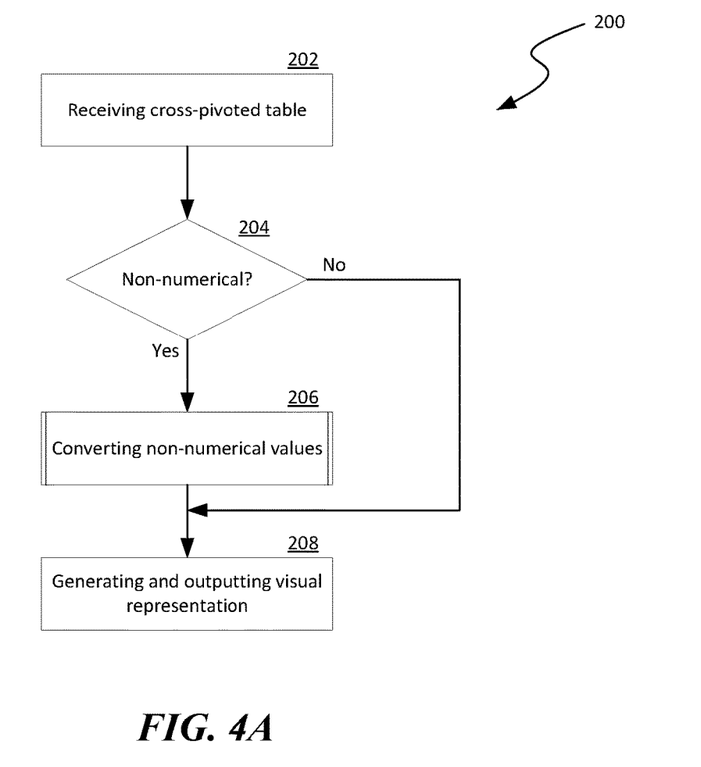
FIGS. 4A-4B are flow diagrams illustrating embodiments of a process of providing visualization of cross-pivoted data in accordance with embodiments of the disclosed technology.

FIG. 4A is a flowchart illustrating embodiments of a process 200 of providing visualization of cross-pivoted data in accordance with embodiments of the disclosed technology. As shown in FIG. 4A, the process 200 can include receiving a cross-pivoted table at stage 202. In one embodiment, the received cross-pivoted table can include a spreadsheet file. In other embodiments, the received cross-pivoted table can include other suitable types of files from any suitable sources.

The process 200 can include determining whether one or more data dimensions of the received cross-pivoted table contain non-numerical values at stage 204. In one embodiment, the determination can be based on an inspection of data property associated with the cross-pivoted table. In other embodiments, the determination can be based on metadata, user input, or other suitable information associated with the cross-pivoted table.

The process 200 can then include converting non-numerical values to numerical values in response to determining that one or more data dimensions of the received cross-pivoted table contain non-numerical values at stage 206. One example process for converting the non-numerical values is described in more detail below with reference to FIG. 4B.

The process 200 can include generating and outputting visual representation of the received cross-pivoted table at stage 208. In certain embodiments, generation of the visual representation can include generating a three-dimensional graph of the cross-pivoted table using the converted numerical values along one or more data dimensions. In other embodiments, generation of the visual representation can include generating tiered three-dimensional graphs or other suitable representations.

Figure 4B:
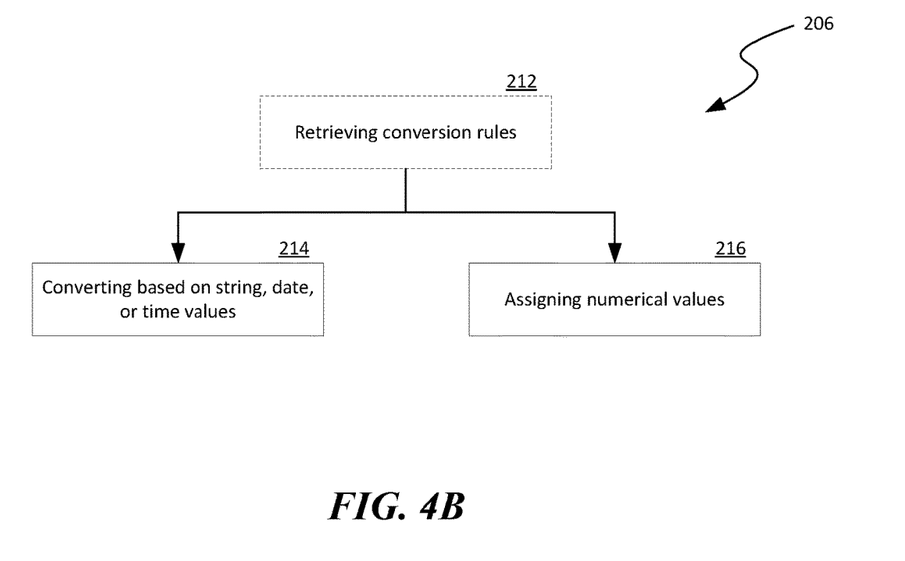

FIG. 4B is a flowchart illustrating embodiments of a process 206 of converting non-numerical values in accordance with embodiments of the disclosed technology. As shown in FIG. 4B, the process 206 can initially include an optional stage 212 in which one or more conversion rules are received. The conversion rules can specify how certain types of non-numerical values can be converted into numerical values. The process 206 can then include converting the non-numerical values based on string, date, time, or other suitable values at stage 214; or alternatively, assigning numerical values to corresponding non-numerical values at stage 216.

Figure 5A:
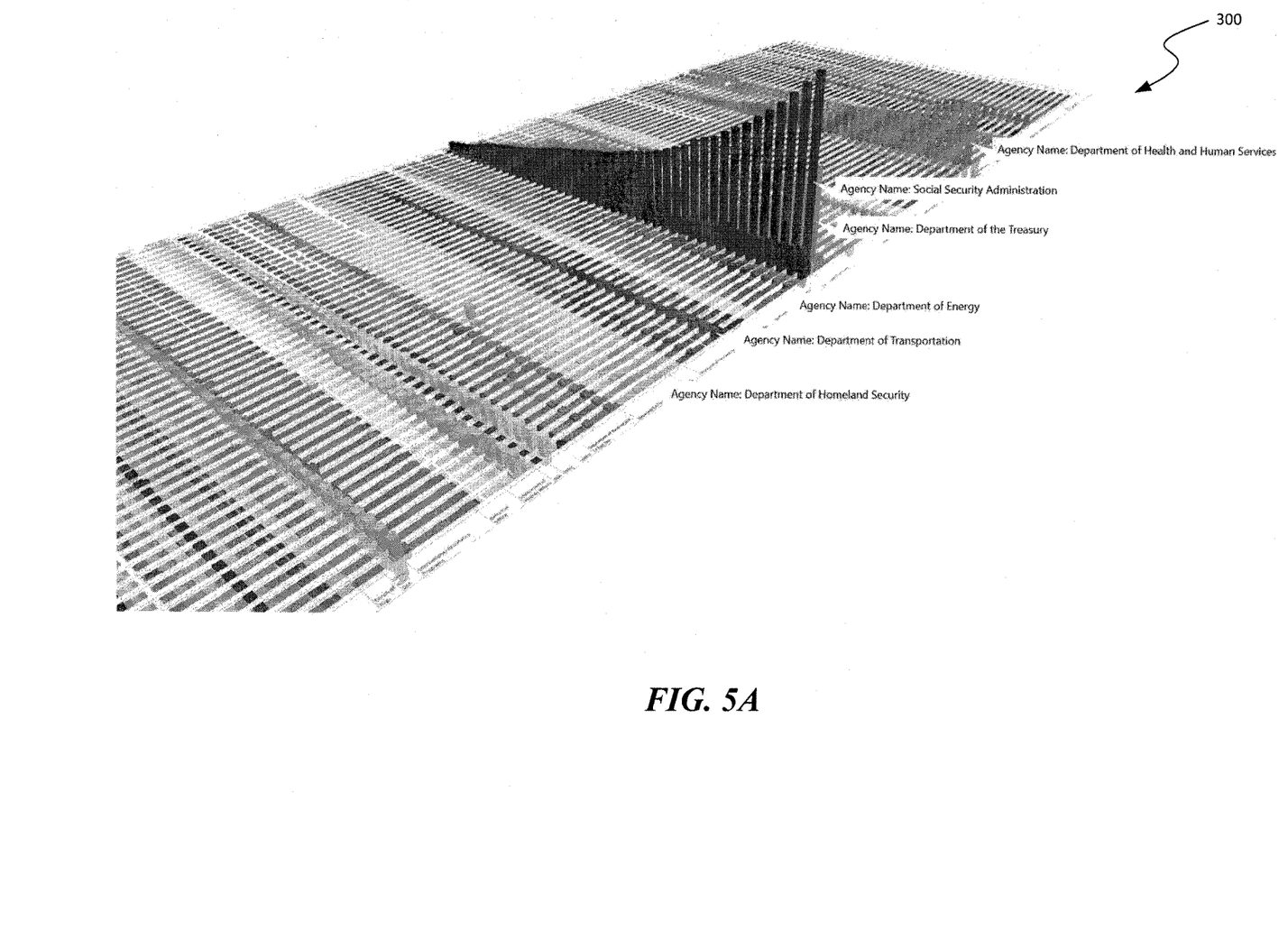
FIGS. 5A and 5B are example output of visualization of cross-pivoted data in accordance with embodiments of the disclosed technology.
Figure 5B:
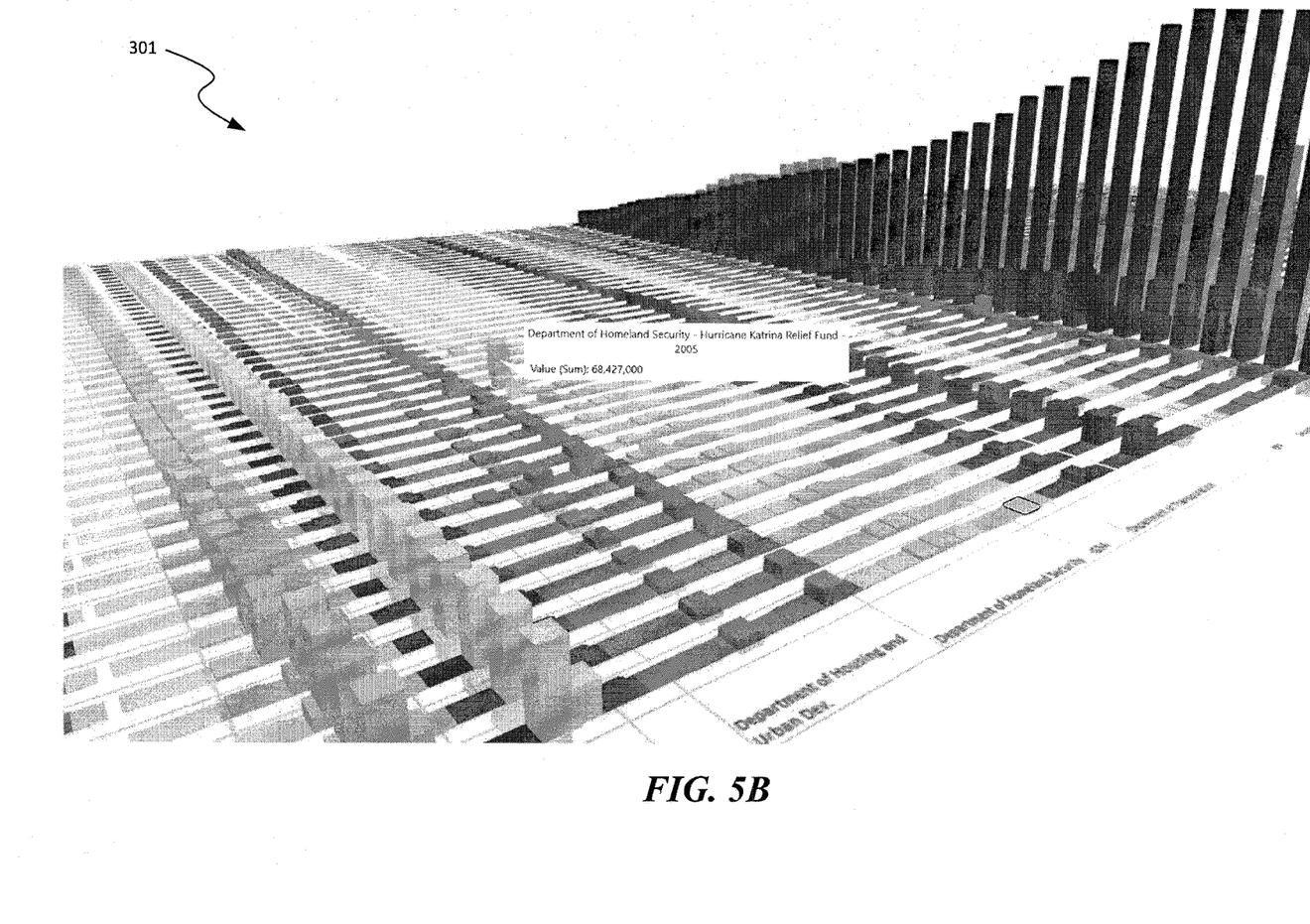

FIGS. 5A and 5B are example output of visualization of cross-pivoted data in accordance with embodiments of the disclosed technology. In FIGS. 5A and 5B, three-dimensional graphs representing White House budget for 2016 as contained in budauth.csv file published on GitHub. The data in budauth.csv was structured so that a human can consume the data even without manipulation. In its raw form, there are 4443 rows and 57 columns in the budauth.csv.

Sequential numbers were used for the rows, which are in the 'ID' column. Years were converted into numerical values using the function below:

=DAYS360(DATE(2020,1,1),[@YearAsDate]

for events that happen on a day-to-day basis rather than a yearly basis. There were only 44 distinct vales for Y mapping to the 44 years in the columns. FIG. 5A shows the data pivoted by Agency name and by year. FIG. 5B shows spending values by particular agencies aggregated in a single column in a particular year.

As shown in FIGS. 5A and 5B, a user can interact with the provided visual representation even without flattening or un-pivoting the underlying data. For example, if a user filters out the Value field, which represents spending or deficit to show positive values below $20 billion dollars, the user can then explore the agencies that are not as big and not visible in the initial representation.

Figure 6:
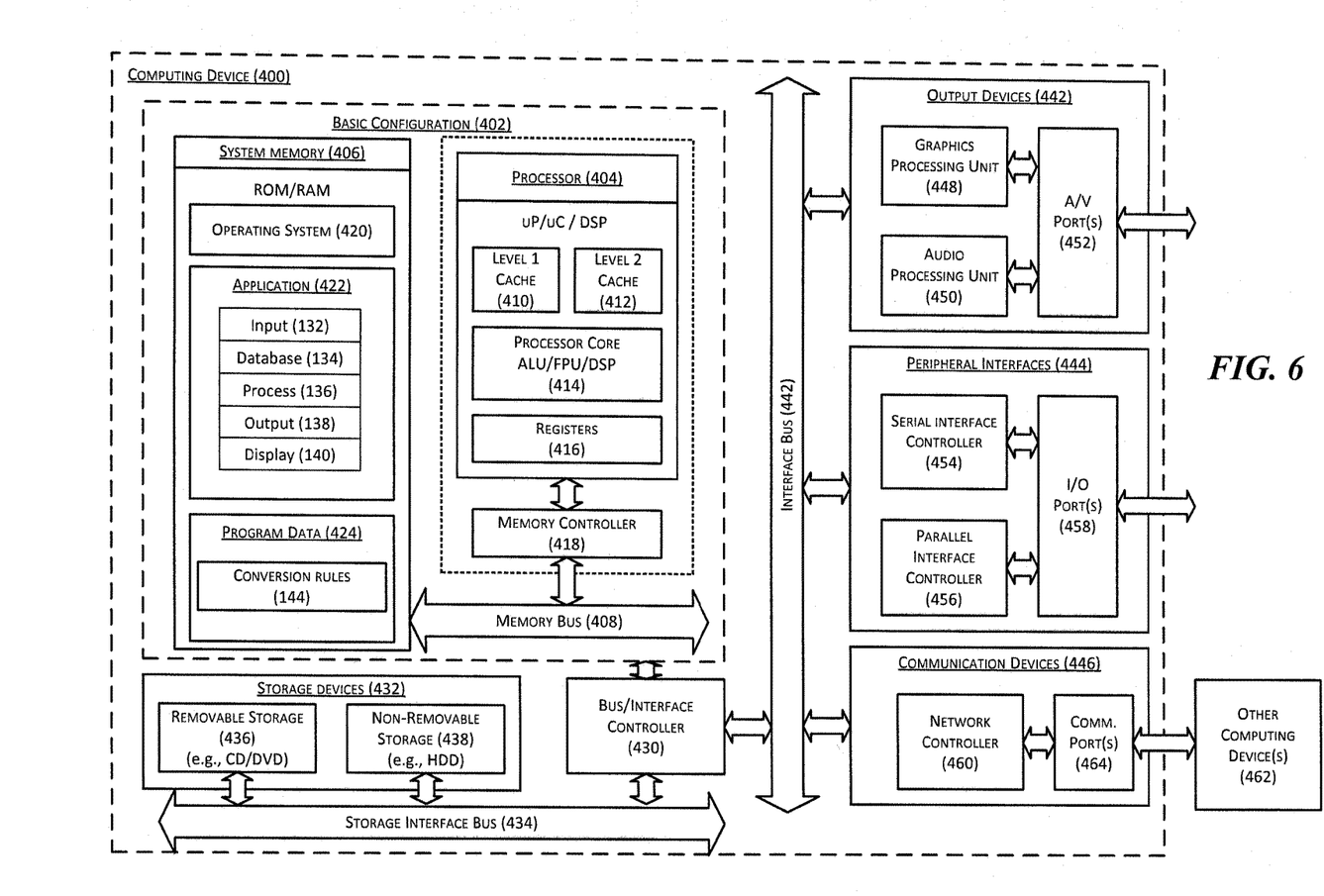
FIG. 6 is a computing device suitable for the computing system in FIG. 1.

FIG. 6 is a computing device 400 suitable for the computing system 118 in FIG. 1. In a very basic configuration 402, computing device 400 typically includes one or more processors 404 and a system memory 406. A memory bus 408 may be used for communicating between processor 404 and system memory 406.

Depending on the desired configuration, the processor 404 may be of any type including but not limited to a microprocessor (µP), a microcontroller (µC), a digital signal processor (DSP), or any combination thereof. The processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, the system memory 406 may be of any type including but not limited to volatile memory (such as RAM), non-volatile memory (such as ROM, flash memory, etc.) or any combination thereof. The system memory 406 can include an operating system 420, one or more applications 422, and program data 424. As shown in FIG. 6, in certain embodiments, the application 422 may include, for example, the input module 132, database module 134, process module 136, output module 138, and a display module 140, as described in more detail above with reference to FIG. 2. In other embodiments, the application 422 can also include other suitable components. The program data 424 may include, for example, the conversion rules 144. This described basic configuration 402 is illustrated in FIG. 6 by those components within the inner dashed line.

The computing device 400 may have additional features or functionality, and additional interfaces to facilitate communications between basic configuration 402 and any other devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436, and non-removable storage devices 438 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 400. Any such computer readable storage media may be a part of computing device 400. The term "computer readable storage medium" excludes propagated signals and communication media.

The computing device 400 may also include an interface bus 440 for facilitating communication from various interface devices (e.g., output devices 442, peripheral interfaces 444, and communication devices 446) to the basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A method for rendering a cross-pivoted table on a computing system having a processor and a display operatively coupled to the processor, the method comprising:

receiving a cross-pivoted table having a first dimension, a second dimension, and a plurality of data points each corresponding to a first value in the first dimension and a second value in the second dimension;

determining if the first values of the first dimension and the second values of the second dimension are non-numerical;

in response to determining that at least one of the first values of the first dimension or the second values of the second dimension are non-numerical, converting the at least one of the non-numerical first values of the first dimension or the second values of the second dimension to numerical values based on conversion rules that specify how different types of non-numerical values are to be converted to numerical values; and plotting the plurality of data points on the display without flattening the cross-pivoted table to produce a visual representation of the plurality of data points of the cross-pivoted table based on the converted numerical values of the at least one of the first values of the first dimension or the second values of the second dimension.

2. The method of claim 1 wherein converting the at least one of the non-numerical first values of the first dimension or the second values of the second dimension to numerical values includes converting the at least one of the non-numerical first values of the first dimension or the second values of the second dimension to numerical values based on a data property of the first values of the first dimension or the second value of the second dimension.

3. The method of claim 1 wherein converting the at least one of the non-numerical first values of the first dimension or the second values of the second dimension to numerical values includes converting the at least one of the non-numerical first values of the first dimension or the second values of the second dimension to numerical values based on ASCII values, date values, or time values of the first values of the first dimension or the second values of the second dimension.

4. The method of claim 1 wherein converting the at least one of the non-numerical first values of the first dimension or the second values of the second dimension to numerical values includes assigning distinct numerical values to the at least one of the non-numerical first values of the first dimension or the second values of the second dimension to numerical values.

5. The method of claim 1 wherein converting the at least one of the non-numerical first values of the first dimension or the second values of the second dimension to numerical values includes assigning distinct and sequential numerical values to the at least one of the non-numerical first values of the first dimension or the second values of the second dimension to numerical values.

6. The method of claim 1 wherein producing the visual representation includes plotting the plurality of data points as a three-dimensional graph with the converted at least one of the numerical values of the first values of the first dimension or the second values of the second dimension as the first and second axes, respectively.

7. The method of claim 1 wherein:
the first values of the first dimension summarize data from a plurality of sub-categories; the method further includes:
receiving user selection to explore the plurality of sub-categories of the first dimension in relation to the outputted visual representation; and
outputting a three-dimensional graph of the sub-categories based on the user selection.

8. The method of claim 1, further comprising:
receiving user selection to aggregate the first values or the second values in relation to the outputted visual representation; and
adjusting the outputted visual representation based on the user selection to aggregate the first values or the second values.

9. A computing system, comprising:
a processor, a memory, and a display operatively coupled to one another, wherein the memory contains instructions that when executed by the processor cause the processor to:
receive a cross-pivoted table having a first dimension, a second dimension, and a plurality of data points each corresponding to a first value in the first dimension and a second value in the second dimension, wherein at least one first value or at least one second value comprises a non-numerical value;
convert each non-numerical value to corresponding numerical values based on conversion rules that specify how different types of non-numerical values are to be converted to numerical values; and
plot individual data points on the display without flattening the cross-pivoted table to provide a visual representation of the plurality of data points of the cross-pivoted table based on the converted numerical values of the at least one of the first values of the first dimension or the second values of the second dimension.

10. The computer system of claim 9, wherein the memory further stores instructions to cause the processor to:
determine if the at least one of the first values of the first dimension or the second values of the second dimension are text strings; and
based on a determination that the at least one of the first values or the second values are text strings, converting the at least one of the first values of the first dimension or the second values of the second dimension to corresponding numerical values based on a string value of the individual text strings of the at least one of the first values or the second values.

11. The computer system of claim 9, wherein the memory further stores instructions to cause the processor to:
determine if the at least one of the first values of the first dimension or the second values of the second dimension are dates; and
based on a determination that the at least one of the first values or the second values are dates, converting the at least one of the first values of the first dimension or the second values of the second dimension to corresponding numerical values based on a date value of the individual dates of the at least one of the first values or the second values.

12. The computer system of claim 9, wherein the memory further stores instructions to cause the processor to, based on a determination that the at least one of the first values or the second values are non-numerical, assign sequential numerical values to the at least one of the first values of the first dimension or the second values of the second dimension.

13. The computer system of claim 9 wherein the plurality of data points are plotted in a three-dimensional graph along a first axis and a second axis corresponding to the converted numerical values of the first values and second values, respectively.

14. A computer readable storage medium containing instructions that when executed by a processor cause the processor to perform a process, comprising:
determining if a first dimension and a second dimension of a cross-pivoted table contain non-numerical values, the cross-pivoted table having a plurality of data points each dependent upon a first value in the first dimension and a second value in the second dimension;
in response to determining that the first dimension and the second dimension contain non-numerical first and second values, respectively, converting the non-numerical first and second values to corresponding numerical first and second values based on conversion rules that specify how different types of non-numerical values are to be converted to numerical values; and
plotting, on a display, a three-dimensional visual representation of the plurality of data points of the cross-pivoted table, without flattening the cross-pivoted table, using the numerical first and second numerical values as first and second axis, respectively.

15. The computer readable storage medium of claim 14 wherein converting the non-numerical first and second values includes converting the non-numerical first and second values to numerical first and second values based on ASCII values, date values, or time values of the non-numerical first and second values.

16. The computer readable storage medium of claim 14 wherein converting the non-numerical first and second values includes receiving a user input specifying numerical ranges for the numerical first and second values, and wherein converting the non-numerical first and second values includes converting the non-numerical first and second values to numerical first and second values within the user specified numerical ranges.

17. The computer readable storage medium of claim 14 wherein converting the non-numerical first and second values includes assigning sequential numerical values to the non-numerical first and second values of the first dimension and the second dimension, respectively.

\* \* \* \* \*